United States Patent [19]

Miller et al.

[11] 4,031,782

[45] June 28, 1977

[54] METHOD AND APPARATUS FOR A TRANSMISSION CONTROL SYSTEM

[75] Inventors: Alan Leonard Miller, Mount Prospect, Ill.; John Saxon Ivey, Bloomfield Hills, Mich.

[73] Assignee: Borg-Warner Corporation, Chicago, Ill.

[22] Filed: Feb. 27, 1976

[21] Appl. No.: 661,896

[52] U.S. Cl. .................................................. 74/866
[51] Int. Cl.$^2$ .................. B60K 41/18; G05G 21/00
[58] Field of Search ............ 74/863, 864, 865, 866, 74/337, 752 D

[56] References Cited
UNITED STATES PATENTS

| | | | |
|---|---|---|---|
| 3,726,159 | 4/1973 | Mizote | 74/866 |
| 3,881,368 | 5/1975 | Furuhashi et al. | 74/866 |
| 3,882,740 | 5/1975 | Forster et al. | 74/866 |
| 3,961,546 | 6/1976 | Gilmore et al. | 74/866 |
| 3,983,766 | 10/1976 | Forster et al. | 74/866 |

*Primary Examiner*—Samuel Scott
*Assistant Examiner*—Lance W. Chandler
*Attorney, Agent, or Firm*—James J. Jennings, Jr.

[57] ABSTRACT

A control system used to change the gear ratio in a gear set regulated by a change-gear signal from a control unit is disclosed. A transducer provides an output torque signal which is compared to other signals for initiating the gear change.

In another arrangement, an automatic transmission changes a gear ratio when engine torque is transferred from one member to another member of a three member planetary gear set. This transfer is accomplished through friction elements engaged by hydraulic pressure. A closed loop electrical circuit is completed between a transducer, which provides an electrical signal related to the output torque of the transmission, and a control valve, to vary the control valve pressure. A circuit for computing reaction torque is coupled between the transducer and a logic control circuit, which provides logic command signals for controlling operation of components in the closed loop circuit. The closed loop circuit includes a pulse width modulation circuit for regulating the control valve operation, and a feed-forward circuit to minimize the delay in the control valve portion of the system.

18 Claims, 14 Drawing Figures

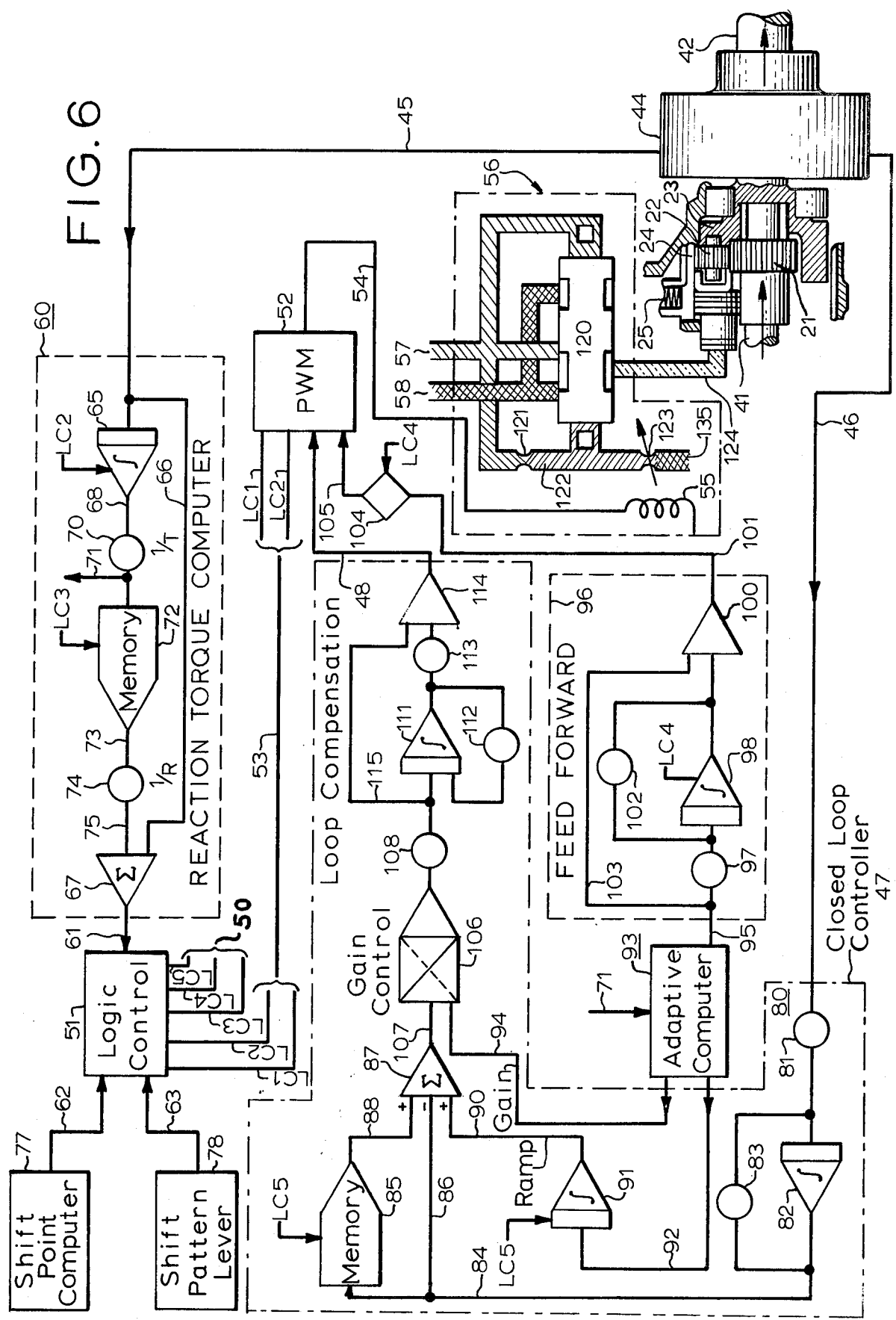

TRANSDUCER
44

METHOD AND APPARATUS FOR A TRANSMISSION CONTROL SYSTEM

BACKGROUND OF THE INVENTION

Various systems have been devised and implemented to control the change of gear ratios in an automatic transmission. This is generally done with a hydraulic system, including a hydro-mechanical control valve mechanism for modifying the pressure applied to various friction elements in the transmission and to selectively hold and release different components of a planetary gear set. For example, the engine output shaft can be connected to drive the sun gear of such a set, which also includes a plurality of planet gears rotatable on a carrier element and disposed between the sun gear and the outer ring gear. When the ring gear is held against rotation, output drive torque is available from the planet carrier at a first speed ratio. To change ratio, the sun gear is locked to the outer ring gear, which is no longer held against rotation, providing a direct drive connection. This is the operation which occurs in a typical upshift.

A great deal of research has been directed to optimizing the shift "quality". In general, it is not desirable to have a shift of very brief duration, as this produces a jerk by the rapid change in vehicle acceleration, which is very noticeable and found objectionable by most drivers. If the shift time is stretched out for too long a period, undue wear is imposed on the friction elements and other components of the transmission. Therefore, the optimum shift quality occurs somewhere between the too-short time duration, producing the objectionable jerk sensation, and the too-long time duration producing the objectionable component wear. A comprehensive treatment of this subject has been provided by F. J. Winchell and W. D. Route in "Ratio Changing the Passenger Car Automatic Transmission", which appears as Chapter 10 in the SAE publication "Design Practices—Passenger Car Automatic Transmissions", Copyright by the Society of Automotive Engineers, Inc., 1973. In particular FIG. 21 of this chapter depicts speed, torque and pressure variations during a power-on upshift.

It is therefore a primary object of the present invention to provide a control system for optimizing the shift quality of an automatic transmission.

A more specific object of the invention is to utilize the parameter which can be employed most successfully in optimizing the shift quality.

A corollary object of the present invention is the provision of a control system for measuring such parameter, directly or indirectly, and providing optimum shift control as a function of such parameter.

SUMMARY OF THE INVENTION

In a general sense the invention includes a control system for regulating the change of gear ratio in a gear set, whether sensed and/or accomplished by fluid, mechanical or electrical components. A control unit is used to effect the gear change when it receives a change-gear signal. An important aspect of the invention is the use of a transducer to provide an output torque signal which is used in effecting the change of the gear ratio.

In one embodiment of the invention, an electronic control system is provided to regulate the change of gear ratio in an automatic transmission. A transducer is positioned to sense the transmission output torque and to provide an electrical signal which varies as a function of that torque. A control valve varies the fluid pressure to the energizing portion of the friction element to effect a change in gear ratio, and an error signal is provided to control the valve operation.

Particularly in accordance with this embodiment of the invention, a closed loop controller is coupled between the transducer and the control valve, to receive the torque-indicating signal and provide the error signal for varying the control valve operation as a function of the output torque signal. In addition a logic control circuit is connected to provide a plurality of logic command signals for application to the closed loop controller as a function of a reaction torque signal. A reaction torque computation circuit is connected to receive the output torque signal from the transducer, and to produce the reaction torque output signal for application to the logic control circuit.

THE DRAWINGS

In the several figures of the drawings, like reference numerals identify like components, and in those drawings:

FIG. 6 is a block diagram, partly in schematic form, similar to FIG. 5 but depicting additional details of the present invention;

GENERAL BACKGROUND DISCUSSION

Figure 1:
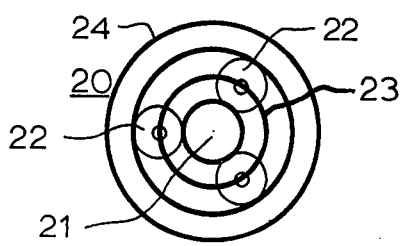
FIGS. 1 and 2 are simplified diagrams indicating basic components of an automatic transmission.
Figure 2:
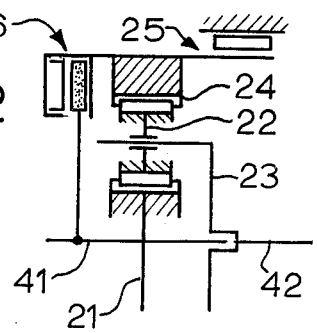

FIGS. 1 and 2 show a general arrangement of a planetary gear set 20, of a type which may be used in automatic transmissions. Planetary gear set 20 is adapted to provide a drive relationship between a drive shaft 41 and a driven shaft 42. A sun gear 21 is connected to shaft 41, which represents the input mechanical driving connection to the automatic transmission. That is, drive shaft 41 and sun gear 21 receive drive from the engine or other prime mover. Meshed with sun gear 21 are a plurality of pinion gears 22, generally termed "planets" in that they can rotate around the sun gear 21 in addition to rotating upon their own axes. A carrier 23 is provided, connected to driven shaft 42, and has rotatably journalled thereon each of the planet gears 22. Outside the planet gears is a ring gear 24, which has teeth on its inner surface meshing with the teeth of the planet gears as they rotate with respect to the ring gear. In general when the sun gear 21 is driven with the ring gear 24 held stationary, output drive torque is available from planet carrier 23 and driven shaft 42.

FIG. 2 shows a one-way clutch 25, schematically illustrated as connected between ground or a stationary member and ring gear 24. Those skilled in the art will appreciate that a band or other reactive member can be used in lieu of a one-way clutch. A friction clutch 26 is schematically illustrated as engageable to connect ring gear 24 and sun gear 21 for rotation together.

If the ring gear 24 is locked against rotation, then the planet gears 22 are rotated when the sun gear is driven, and output drive at a first reduced speed ratio may be taken from driven shaft 42. When it is desired to change the speed ratios, or shift gears, this is accomplished by releasing the outer ring gear 24 and connecting the ring gear with sun gear 21. This provides a direct drive between the input and output shafts at a second speed ratio of 1:1. Of course additional combinations of planet and ring gears can be provided to produce a multiplicity of speed ratios in an automatic transmission, but the showing of FIGS. 1 and 2 is sufficient for a background discussion of the present invention. One-way clutch 25 holds ring gear 24 against rotation in one direction to establish the reduced drive ratio and permits free rotation of ring gear 24 in the other direction. Clutch 26 is engaged to directly connect the sun gear with the ring gear, to provide the second speed ratio.

Figure 3:
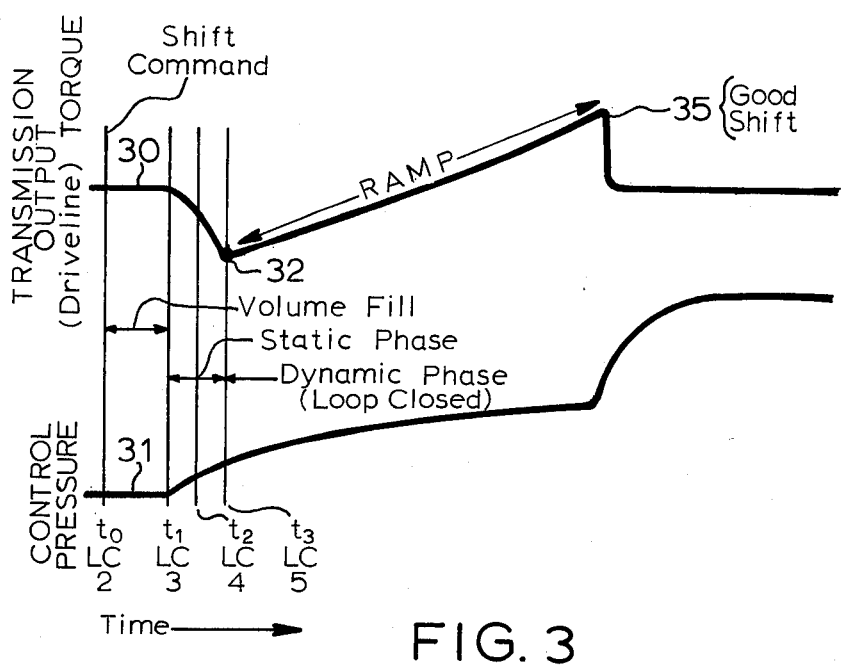
FIG. 3 is an idealized graphical illustration useful in understanding the shift characteristics of an automatic transmission.

FIG. 3 illustrates two different curves 30 and 31, useful in explaining a power upshift. Curve 30 denotes the torque at the transmission output connection, generally termed driveline torque. Curve 31 represents the pressure acting on the piston of the oncoming friction element. At the outset the driveline torque is equal to the engine output times the gear ratio (neglecting efficiency), and the element pressure remains at zero; at time $t0$ a shift command is initiated. This command can be supplied by the operator or received from a shift point computer in a manner well known and understood by those skilled in the art. Between time $t0$ and time $t1$, the transmission remains in the "volume fill" phase of the shift operating sequence, as the piston volume of the actuator is being filled with virtually no change in the control pressure and no change in the torque. This occurs because even though fluid is being admitted under pressure to engage the friction element, there is a certain amount of slack, or open space in the piston; this volume must be filled before there is an actual physical engagement of the friction element with the reaction member. At time $t1$ the "static" phase of the shift sequence is commenced, as the oncoming friction element begins to apply torque to its associated gear or other component. In the static phase, from $t1$ to $t3$, the control pressure and torque are changing, but there is no change in the engine speed. A significant aspect of the invention is the provision of a feed-forward circuit, to be explained hereinafter, to compensate for the system operating delay which would otherwise result from the time required to fill the piston volume and commence the static phase of the shift at time $t1$.

At the time $t2$ the system is half-way through the static phase of the shift. Subsequently, it will be apparent that the system generates a particular logic command signal for use at this time, but for the present it is sufficient to note that the control pressure is still rising at time $t2$, and the driveline torque is still dropping as the oncoming friction element begins to apply a force to its associated gear. At time $t3$ the static phase of the shift is completed, and one-way clutch 25 has been released. As shown at point 32 on the torque curve 30, the driveline torque begins to increase at this time, $t3$, which also marks the end of the static phase and beginning of the "dynamic" phase of the shift. It is at this time—beginning the dynamic phase of the shift—that the control loop of the present system is closed, as will be explained hereinafter.

The change in driveline torque can occur over a short, medium or long time span. If the shift is accomplished in a relatively short time, this results in poor "feel", or an objectionable jerk being felt by the driver. If the dynamic phase of the shift is extended over a very long time, this imposes excess wear on the transmission and associated components. One satisfactory compromise is represented by curve 35. This means that the shift occurs over a sufficiently brief time duration so that excess component wear is not caused, and likewise that the driver does not feel a jerk or rapid transition in the shift. A discussion of the shift quality is set out in the "Power-On Upshift" section of the SAE reference noted previously. It is toward the production of a good quality shift, such as represented by curve 35, that the present invention is directed.

GENERAL SYSTEM DESCRIPTION

Figure 4:
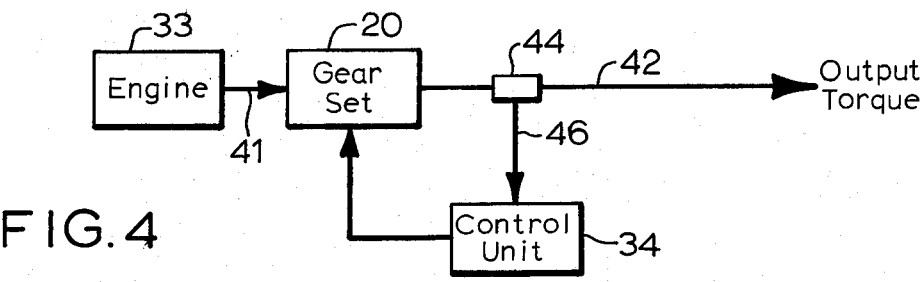
FIG. 4 is a block diagram of a simplified control system utilizing the principles of this invention.

The simplified showing in FIG. 4 is that of a control system for regulating the change of gear ratio in a gear set 20. The gear set has an input connection for receiving drive from an engine 33, and an output mechanical drive connection for supplying drive torque to a load. The system includes a control unit 34, which may be a servo motor, having an output connection coupled to the gear set 20 to effect the change of gear ratio when the control unit supplies a change-gear signal. A transducer 44 is positioned in the mechanical output driving connection of the gear set 20. The transducer 44 provides an output torque signal which varies as a function of the output drive torque provided by the gear set 20. Some means, shown here as an electrical conductor 46, is coupled between the transducer and the control unit, to pass the output torque signal to the control unit 34, so that the control system can pass the change-gear signal to the gear set 20 at the proper time. The control unit 34 and means 46 can be changed to fluid and/or mechanical components as desired.

DESCRIPTION OF PREFERRED EMBODIMENT

Figure 5:
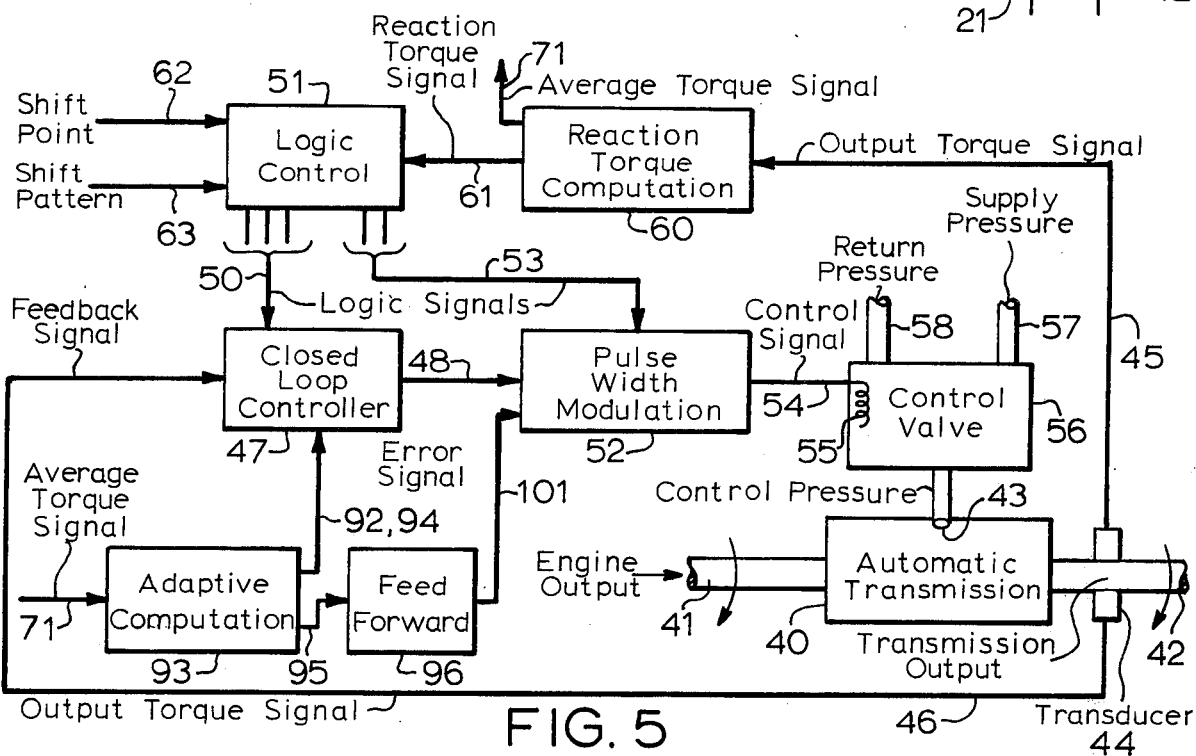
FIG. 5 is a block diagram of an electronic control system constructed in accordance with the present invention.

FIG. 5 depicts in a block arrangement an electronic control system developed in accordance with this invention for changing the gear ratio in an automatic transmission 40. An input shaft 41 represents the input mechanical driving connection to the transmission, and this is normally coupled to the output of the engine or other prime mover. The output driving connection of the transmission, which would be taken from the carrier as described above, is represented by the shaft 42. This shaft is normally coupled to a shaft for driving the vehicle wheels. In addition the transmission includes at least one fluid inlet 43 for receiving a fluid under pressure to control the friction element and thus control the change of gear ratio.

A transducer 44 is positioned to sense the torque at the output driving connection of the transmission, and to provide an electrical signal which is a function of the output torque, on each of lines 45 and 46. A closed loop controller 47 comprises a plurality of components, as will be explained hereinafter, for providing an error signal on line 48 as a function of both the output torque signal received as a feedback signal over line 46, and a plurality of logic command signals received over line 50 from a logic control circuit 51. The error signal on line 48 is applied to a pulse width modulation circuit 52, which also receives a plurality of logic command signals over line 53 from the logic control circuit. The output signal from the pulse width modulation circuit 52 is a control signal which is applied over line 54 to a winding 55 which is part of an electro-hydraulic control valve 56, the output side of which is coupled to the inlet 43 of the automatic transmission. Conduit 57 is connected to receive a fluid under pressure from a pump (not shown) in a manner well known and understood in this art.

A reaction torque computation circuit 60 is connected to receive the output torque signal over line 45 and produce, on output line 61, a simulated reaction torque signal for application to the logic control circuit 51. The logic control circuit also receives a signal over line 62 representing a shift point, to indicate issurance of a shift command. A shift pattern signal can be generated and supplied over line 63 to the logic control circuit 51. The shift pattern signal on line 63 is that provided when the driver moves the shift lever into a position (that is, a position such as "park", "reverse", "neutral", "drive" and so forth) which changes the operation of a control valve (not shown), and "tells" the electrical system which control valve is to be operated. The shift point signal on line 63 is derived from a unit (not shown) which issues a signal when a shift—up or down—should be initiated. Electronic systems for providing this signal are also available. For purposes of this explanation, conductor 62 is considered as means for providing a shift point signal, and conductor 63 is deemed means for providing a shift pattern and signal. The logic control circuit 51 receives the reaction torque signal, the shift point signal and the shift pattern signal (an explanation of the shift pattern signal is not necessary to an understanding of the basic system operation), and provides a plurality of logic command signals for application over the output cables 50, 53 to effect the operation of components within closed loop controller 47 and the operation of pulse width modulation circuit 52. Subsequent explanations will make it apparent that the reaction torque computation circuit 60 is an important component of the present invention.

Reaction torque computation circuit 60 also provides an average torque level signal on line 71, by averaging the instantaneous torque signal received from the transducer over a given time period. This average torque signal is applied to an adaptive computation circuit 93, which produces output signals that vary as a function of the average torque level. The first output signal from adaptive computation circuit 93 is applied over line 92, 94 as an input command signal to closed loop controller 47. This first output signal affects the controller operation and varies both (1) the slope of the "ramp" portion of torque curve 35, and (2) the gain of the closed loop controller. The second output signal from adaptive computation circuit 93 is applied over conductor 95 to a feed-forward circuit 96, which in turn passes a signal over line 101 to pulse width modulation circuit 52. The feed-forward circuit in effect compensates the control valve 56 operation for the time required ($t0$–$t1$, FIG. 3) to fill the piston before the static phase of the shift is commenced. Hence the adaptive computation circuit 93 and the feed-forward circuit 96 improve the overall regulation of the closed loop control system of this invention.

DETAILED DESCRIPTION OF THE INVENTION

FIG. 6 depicts the basic electronic control system of the invention in more detail. Reaction torque computer circuit 60 is shown to include several stages, with the line 45 being coupled both to the input side of an integrating stage 65 and, over line 66, to one input connection of a summation stage 67. The output side of integrating stage 65 supplied the integrated torque signal over line 68 to a passive circuit 70, effective to multiply the signal on line 68 by the ratio 1/T, representing a time division to produce on line 71 a signal which represents the average driveline torque provided on shaft 42 over the time period T. The application of logic command siganls LC2 to the integrating stage 65 and LC3 to the memory stage 72 are shown, with each logic command signal being generated by the logic control circuit 51 as will be explained hereinafter. The output of memory stage 72 then supplies the average driveline torque signal (for the time T) over line 73 to the passive stage 74, effective to multiply this signal by 1/R or provide on line 75 a signal which represents the average driveline torque adjusted for the gear ratio R. This signal on line 75 is the other input signal to summation stage 67, which then provides the reaction torque signal on line 61 for application to the logic control circuit 51.

Those skilled in the art will appreciate that the reaction torque computer circuit 60 is depicted with simplified analog components connected to provide a reaction torque signal on line 61 as a function of a received instantaneous torque signal on line 45. This is done with the illustrated integrating, memory, divide down and summation stages. It will be apparent that a microprocessor or other digital circuits can be connected to operate in a known fashion to produce the reaction torque signal on line 61 in response to the received instantaneous torque signal on line 45. Hence the terms "reaction torque computation circuit" and "adaptive computation circuit", as used herein and in the appended claims, embrace both the analog and digital forms of such circuits, which are well known and understood in this art.

Shift point computer 77 provides a signal on line 62 to the logic control circuit 51 when a "shift" command is initiated. Likewise a shift pattern lever 78 is conventionally used to provide the shift pattern signal on line 63 to the logic control circuit.

The instantaneous output torque signal on line 46 is applied as shown to the closed loop controller 47, and is initially applied to a feedback filter circuit 80. The signal passes through a first passive component 81 and an active stage 82; a passive component 83 is coupled in parallel with stage 82. The passive components depicted by the circular symbols (such as 81, 83) can be implemented by the use of a fixed or variable resistor. Filter circuit 80 provides a filtered output signal on line 84 which is applied both to the input side of a memory stage 85 and, over line 86, to one of the input connections of a summation stage 87, which also receives second and third input signals. The second input signal is received over line 88 from memory 85, which receives not only the filtered input signal on line 84 but also receives an LC5 logic command signal from logic control stage 51. All of the logic command signals (LC1-LC5) are operational mode signals. As will be explained further, they issue in a time sequence ($t0-t3$, FIG. 3) to regulate the operational state of other components, rather than provide information or command input signals to those components. The third input signal received by summation stage 87 is received over line 90 from another active stage 91, an integrator stage which is connected to provide a ramp slope signal as a function of a level or amplitude signal received over line 92 from an adaptive computer 93. The ramp slope stage 91 also receives an LC5 logic command signal. Thus stage 87 receives a feedback signal on line 86, and on lines 88, 90 receives ramp-determining signals which are collectively termed the "input command" signal.

The adaptive computer 93 in FIG. 6 includes three circuits, which will be described hereinafter, each of which receives the signal over line 71 from the reaction torque computer denoting the average driveline torque during a time period T. The instantaneous driveline torque varies because of the engine variations, torsional vibrations, wheel slip and other irregularities. Hence an average signal must be provided to avoid erroneous operation of the system, and this average signal must be provided in a preset time frame during the shift sequence. To afford an idea of the operating times, the time duration from $t1$ to $t2$ (FIG. 3) is about milliseconds. From the average torque signal on line 71 and the information stored in the computer, a level signal is provided on line 92 to regulate the torque during the shift period, in that it generally controls the slope of the "ramp" of the torque curve as represented by curve 35 in FIG. 3. The adaptive computer 93 also provides a gain-control signal on line 94, and a third output signal on line 95 which is coupled to a feed-forward circuit 96. This feed-forward circuit includes a first passive element 97, an active component 98 which receives not only the signal from component 97 but also an LC4 logic command signal, and an output active component 100 for providing an output signal from the feed-forward combination on line 101. A passive feedback component 102 is coupled around active stage 98, and a direct signal connection is provided from the input side of element 97 over conductor 103 to one input connection of stage 100. This feed-forward circuit is an anticipation circuit for providing a signal over line 101 which tends to compensate for the time delay required to fill the piston volume between times $t0$ and $t1$, before the static phase of the shift sequence begins.

The output signal from feed-forward stage 100 is passed over line 101 to another active element 104, which operates as a switch that is closed upon receipt of an LC4 logic command signal to provide an output signal over line 105 to the pulse width modulation circuit 52. PWM circuit 52 thus receives four input signals: the error signal over line 48 from the closed loop controller 47; the feed-forward compensating signal over line 105; and the logic command signals LC1 and LC2 from the logic control circuit 51. Because LC1 is only generated and supplied over cable 53 when a signal is produced by movement of the shift pattern lever, this signal need not be further described.

In closed loop controller 47, loop gain control circuit 106 receives both the gain-regulating signal over line 94 from the adaptive computer 93, and an output signal over line 107 from summation stage 87. The output signal from gain control circuit 106 is passed through another passive component 108 to a loop compensation circuit 110, which comprises an active stage including an integration circuit 111, a parallel-coupled passive element 112, another passive element 113 coupled between the output side of stage 111 and one input connection of the active stage 114, and a conductor 115 connected to pass a signal directly from component 108 to one input connection of stage 114. The output side of stage 114 is then the closed loop controller output signal, or the error signal, for application to the pulse width modulation circuit 52.

Control valve assembly 56 includes a spool 120. This valve was constructed as a two-stage control valve. However by providing a pulse width modulation (PWM) signal to energize winding 55 in the valve, the valve position can be effectively regulated so that operation similar to that of a continuously variable valve is achieved. Thus in the appended claims the term "control valve" includes a conventional (albeit much more expensive) servo valve, as well as the economical two-position valve disclosed herein. The supply pressure is provided as shown over a conduit 57, and after passing through first stage fixed orifice 121, the fluid in conduit 122 is at the first stage pilot pressure. The first stage variable orifice 123 is regulated by the PWM signal applied to winding 55. Hence the pilot pressure is a function of both the fixed orifice 121 and the variable orifice 123. The other side of the variable orifice 123 is coupled through a channel 135 to the return pressure line 58. The control pressure is provided in line 124, and applied to the transmission for regulating the gear ratio change as described above.

The components of the transmission are also generally shown in FIG. 6, and are numbered in agreement with the general showing of a planetary gear set in FIGS. 1 and 2. The particular transmission controlled by the present invention is not important. Any transmission can be used which provides input and output driving connections, and a gear change controlled by the pressure of the fluid in line 124.

Figure 7:
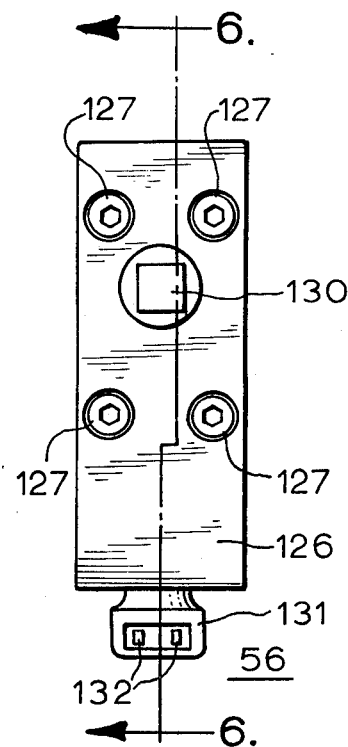
FIG. 7 is an end view and FIG. 8 is a sectional view, illustrating details of a control valve suitable for use with the invention.
Figure 8:
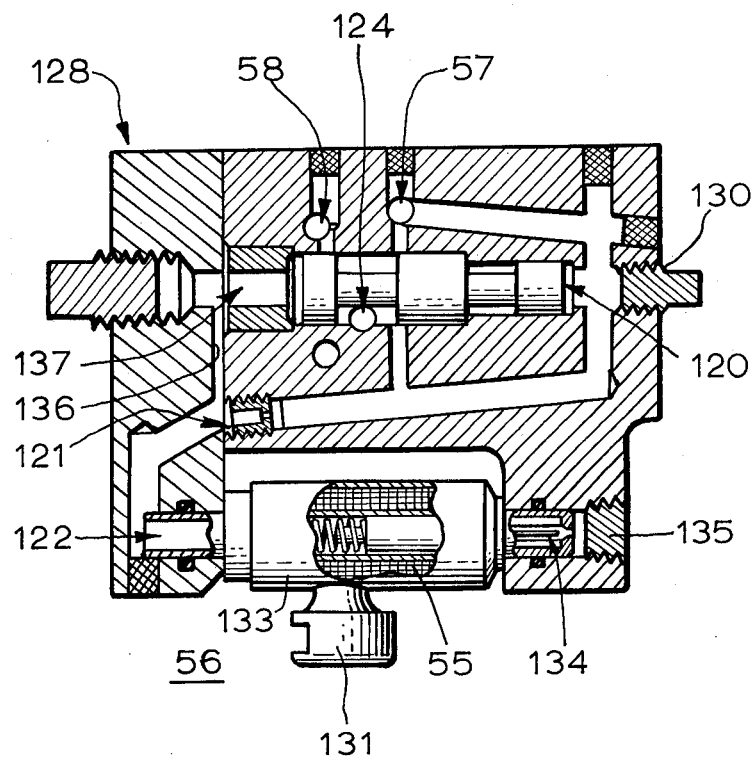

FIGS. 7 and 8 illustrate additional details of the two-position valve 56 used in the preferred embodiment of this invention. The end view of FIG. 7 shows the valve body 126 which is fastened with four screws 127 to the valve body cover 128 (FIG. 8). FIG. 7 also illustrates the stop 130 at the right end of spool 120, and a depending plug body 131 with a pair of electrical contacts 132 for receiving the conductors carrying the output signal from PWM circuit 52 for application to the solenoid winding 55 within the valve body.

FIG. 8 illustrates the solenoid body 133, with the winding 55 inside the solenoid body. The PWM signal applied to the solenoid winding determines the effective position of plunger 134 and thus regulates the effective opening of the variable orifice 123. The fluid under pressure is admitted through the channel 57, and flows to the right and then down, past the right end of spool 120, and then to the left and down to the first stage fixed orifice 121. After this orifice, the major portion of the fluid passes downwardly and to the right through inlet line 122, through the solenoid interior channel. The fluid passing through the interior is then returned through the discharge port 135, which is connected to the same pressure return line as the channel 58.

A portion of the fluid which passes through the first stage fixed orifice 121 also passes upwardly through channel 136 to valve stop 137, thus applying pressure to the left side of spool 120. As this valve is illustrated at full scale, those skilled in the art will readily fabricate a suitable two-position valve or use a valve equivalent to the structure depicted in FIGS. 7 and 8. It is again emphasized that a servo valve, one which is adjustable to any point in a range of positions, can be provided in lieu of the illustrated valve arrangement. However the economic considerations of implementing the system in the automotive market militate against use of the more expensive servo valve.

Figure 9:
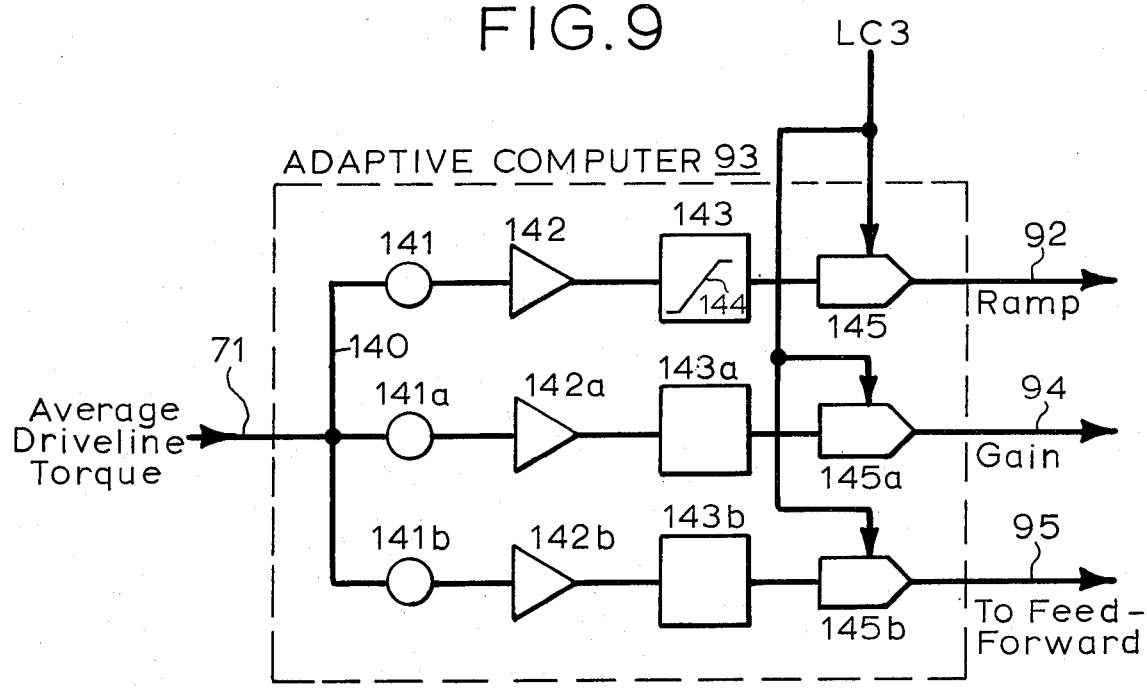
FIG. 9 is a block diagram of an adaptive computation circuit used in a preferred embodiment of the invention.

FIG. 9 depicts in a simplified form the circuit arrangement of adaptive computer 93, which receives two input signals. The first, on line 71, is a function of the average driveline torque, and the second is a logic command signal LC3 which issues at the beginning of the static phase of the shift. For example, the torque signal on line 71 is applied over a common conductor 140 to a first passive component 141 for initially adjusting the gain of the received signal, which is then passed over a buffer amplifier 142 to the input side of a variable gain amplifier 143. The sloping gain characteristic 144 shown within this amplifier indicates that a preset gain can be provided by selection of the appropriate component to provide the degree of slope and thus the desired gain. The output of the adjustable gain stage 143 is applied to the input side of a memory stage 145. This memory stage continually receives the input signal from stage 143 and, when the logic command signal LC3 is received, the signal level then present is stored and continually presented on the output conductor 92 for regulating the ramp portion of the torque curve (FIG. 3). Similar components referenced with the letters "a" and "b" are provided to store and hold signals, on conductors 94 and 95, for application to gain control stage 106 and the feed-forward circuit 96 when the logic command signal LC3 is provided. Other suitable circuits can be utilized to implement the adaptive computation, with the only requirement being the individual modification of the input torque signal on line 71 in the different channels, and the storage of the resulting modified signals at time t1 when LC3 issues.

Figure 10:
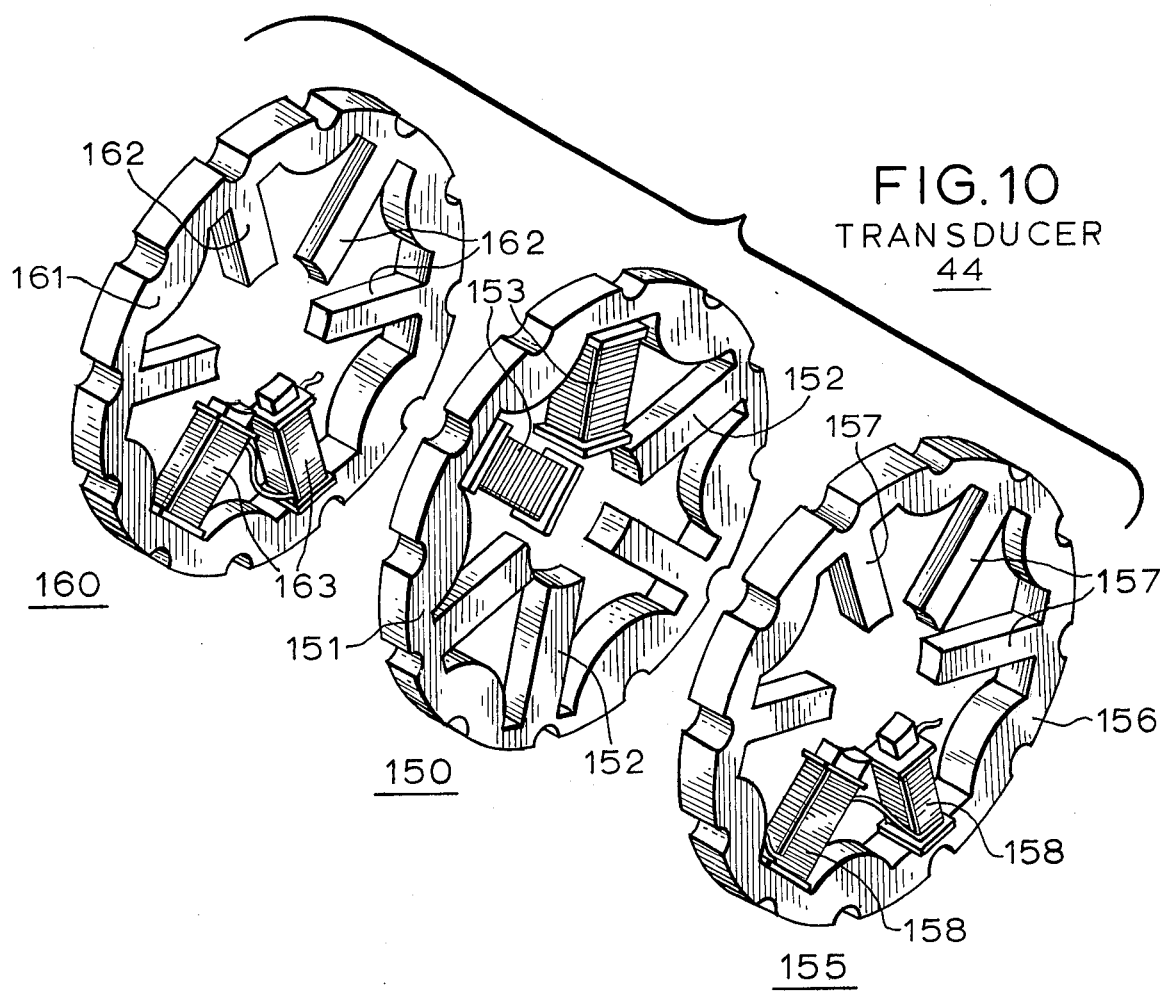
FIG. 10 is an exploded, perspective illustration.
Figure 11:
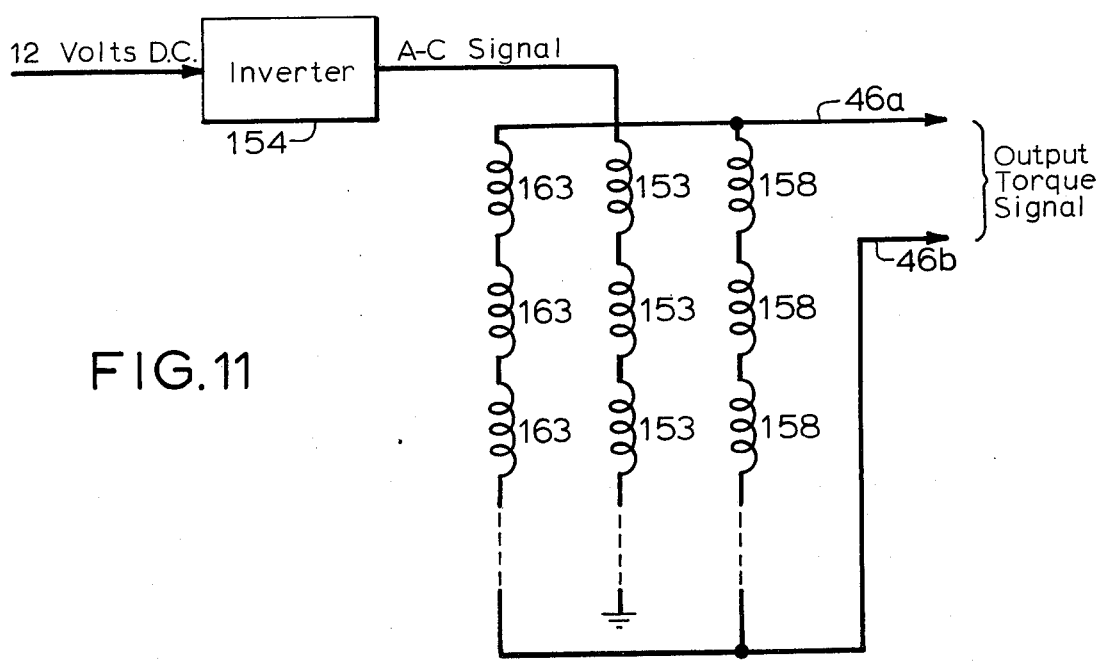
FIG. 11 is a simplified schematic diagram, depicting a transducer suitable for use with the invention.

FIG. 10 is a simplified, exploded view of salient components of transducer 44. In this art it is now generally known that a magnetic field can be established (for example, by passing an a-c current through a coil) adjacent a permeable shaft, and some means for detecting the field or magnetic flux is then positioned near the energizing arrangement used to establish the initial magnetic field. As a permeable member such as output shaft 42 has a torque applied to it, it is subjected to compressive and tensile forces which change its permeability, and thus modify the flux pattern. Accordingly a central structure 150 can be provided with an outer circular magnetic circuit 151, simply provided by a plurality of magnetically conductive ring members or laminations. A plurality of pole pieces 152 are formed by extensions of the outer ring laminations, and individual windings 153 (only two windings are shown) are provided on each of the pole pieces. The windings 153 are connected in series as shown in FIG. 11, and energized from an inverter 154 which in turn is powered from the car's electrical system. The magnetic field thus established passes through that portion of shaft 42 (FIG. 5) which is centered between the pole pieces 152. A second magnetic structure 155 is also provided, with laminations 156 forming a magnetic circuit and another plurality of pole pieces 157 on which a like plurality of windings 158 are provided. These windings 158 are also connected in series and, through output conductors 46a, 46b provide an indication of the stress in the shaft 42 which can be utilized to provide the driveline torque signal. For purposes of this invention, it has been found desirable to place another magnetic structure 160 around the shaft on the other side of the energizing structure 150, with a magnetic circuit 161, a plurality of pole pieces 162 and series-connected windings 163 on these poles, similar to the other arrangements. It has been found that, with only one magnetic pick-up structure (such as 155), a part of the signal induced in the windings 158, 163 varies as a function of the shaft speed, introducing an undesirable error into the torque output signal on conductors 46a, 46b. However the speed-dependent signal components in windings 158, 163 are virtually 180° out of phase with each other. Accordingly by connecting the two arrays of the series-coupled windings 158, 163 in parallel as shown, the speed-caused error component is virtually eliminated and the resultant torque-indicating signal provides a very good representation of the actual driveline torque. Sensor means, other than the illustrated transducer 44, can be used so long as a suitable output torque signal is provided as a function of the drive torque.

Figure 12:
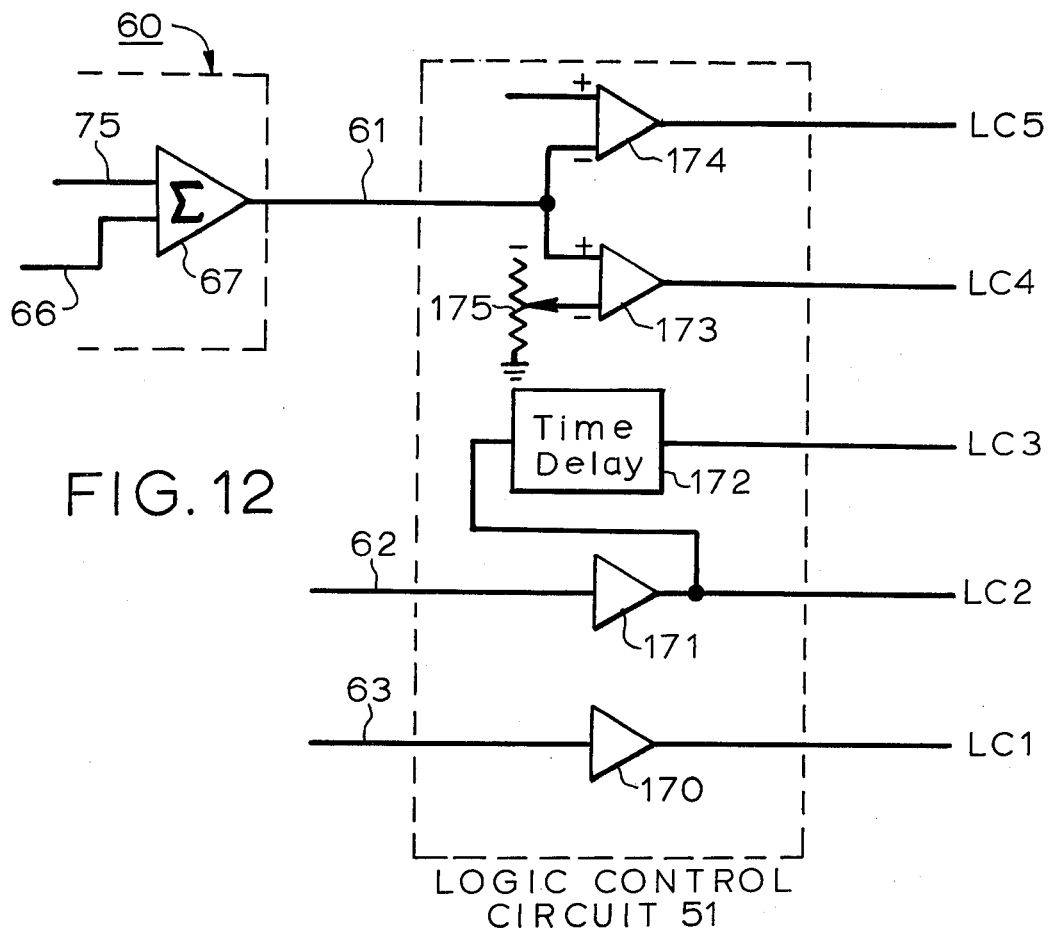
FIG. 12 is a block diagram setting out details of the logic control circuit of the present invention.

FIG. 12 is a simplified diagram depicting components of logic control circuit 51. The shift pattern signal received on line 63 is used, after passing through buffer amplifier stage 170, to provide signal LC1 when a downshift is called for by the operating conditions. The shift point signal on line 62 passes through another buffer amplifier 171 to provide the LC2 signal at time t0 as shown in the idealized diagram of FIG. 3 and the actual graphical illustration of FIG. 13. The output signal from amplifier 171 (FIG. 12) is also passed through a fixed time delay stage 172 to develop the LC3 signal at a predetermined time t1, related to the piston fill volume as previously described.

The simulated reaction torque signal—that is, calculated by operating upon the actual torque signal—on line 61 is applied to one input of a first comparator 173 and also to one input of a second comparator 174. A potentiometer 175 provides a reference signal which is applied to the other input connection of comparator 173. This comparator stage 173 switches, or produces the output logic command signal LC4, at a percentage of the reaction torque value which is determined by setting of potentiometer 175. Comparator 174 provides the LC5 signal at the time when the reaction torque signal on line 61 has decreased to zero.

SYSTEM OPERATION

Figure 13:
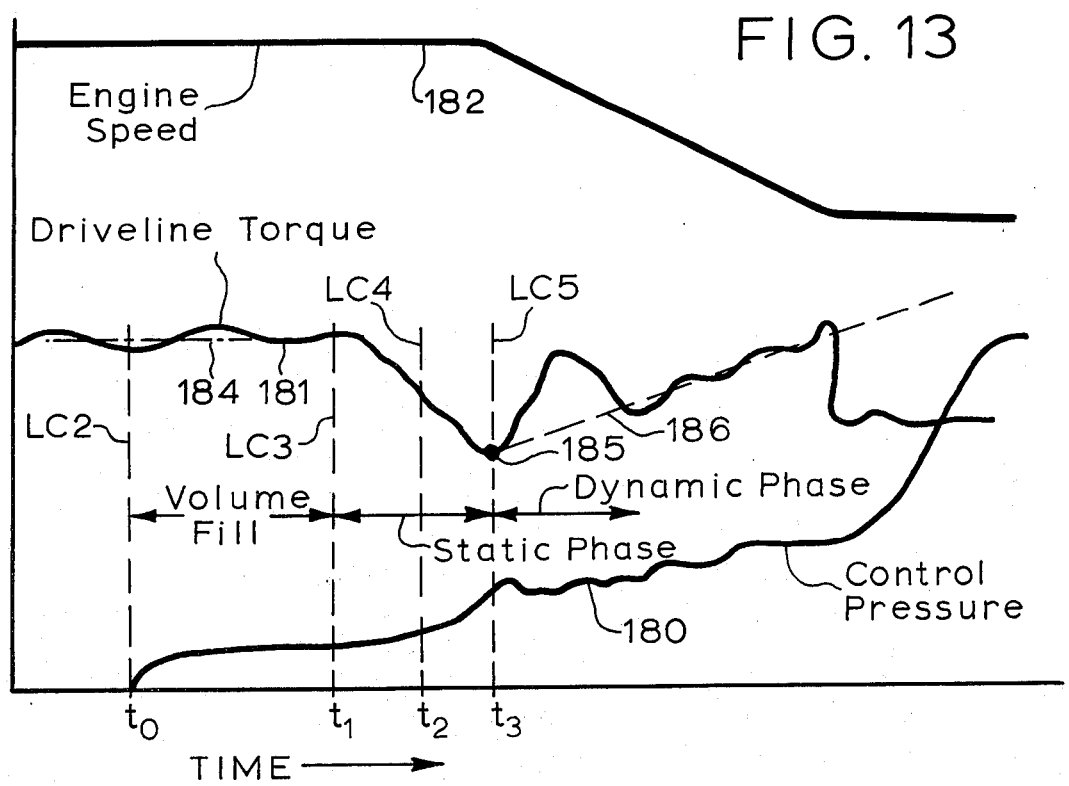

A general perspective of the system operation can best be given in connection with FIG. 13, depicting actual values of the different parameters measured in an operating embodiment of the present invention. As there shown curve 180 represents the control pressure from the valve 56 passed to the controlled friction element in the automatic transmission; curve 181 depicts the actual driveline torque as monitored by transducer 44; and curve 182 illustrates the engine speed variation during the shift sequence.

At the outset the "shift" command is received from shift point computer 77 over conductor 62 and is applied to the logic control circuit. As evident from the description in connection with FIG. 12, this provides the LC2 logic command signal at time $t0$, which is applied to PWM circuit 52 and thus immediately begins to modify the position of the spool 120 in valve 56 to commence filling the piston volume. Simultaneously the LC2 signal is applied to the summation stage 65 in reaction torque computer 60, so that stage 65 goes operational and begins to integrate the level of the driveline signal. As shown in FIG. 13, the actual torque signal 181 varies above and below an average level 184 at this time. Hence an average signal is being developed and, over line 71, is also being supplied to the input circuit of adaptive computer 93. Subsequently, after a time duration determined by the time delay circuit 172, logic command LC3 is issued at time $t1$ as shown in FIG. 13, and applied to memory stage 72 in reaction torque computer 60. Thus the value then present at the input of memory 72, connoting the averaged driveline torque signal, is stored and, after division by gear ratio R, is continuously presented at one input connection 75 of summation stage 67. At the same time the instantaneous driveline torque value is continually supplied over line 66 to the other input connection of summation stage 67. The output signal from stage 67 is the difference between the two input signals, and it is this signal on line 61 which simulates the reaction torque signal.

When the reaction torque value on line 61 differs by a certain percentage from a preset torque value—established by the setting of potentiometer 175—the logic command LC4 is provided by comparator stage 173. If a one-way clutch is not used, this signal LC4 is used to release the band or disc element that retains ring gear 24, and in the system of this invention the command LC4 is used to supply the feed-forward signal from circuit 96 to the PWM circuit 52, to compensate the control valve 56. The LC4 signal is applied to the integrating stage 98 in the feed-forward circuit, so that this stage becomes operational and supplies an initial signal value to one of the inputs of comparator 100. The other input to comparator 100 is the instantaneous signal from adaptive computer 93 which is passed over conductor 103. At time $t2$ signal LC4 also closes switch 104 and thus applies the output from the feed-forward circuit to the pulse width modulation circuit. This occurs approximately mid-way through the static phase of the upshift cycle.

When the instantaneous value of the reaction torque signal on the output conductor 61 goes to zero, comparator 174 is switched and produces LC5 as its output signal. This signal effectively "closes the loop" of the complete control system. That is, memory stage 85 receives an LC5 command and thus stores the value of the torque signal then present on conductor 84; this torque signal is thereafter presented as the output signal on line 88 to summation stage 87, in effect determining the level of the point referenced 185 of the driveline torque. At the same time the LC5 signal causes summation stage 91 to go operational, providing a continuing ramp signal on conductor 90 which determines the slope identified by the broken line 186 of the average torque change desired during the dynamic phase of the upshift. The signals from the adaptive computer were all provided at time $t1$ when the static phase of the shift was initiated, establishing the reference levels for subsequent operation of the stages 85, 91 at time $t3$. At this time the driveline torque was also locked in, over line 86 to the summation stage 87, as an electrical input command to the closed loop circuit. The torque will then change over the average ramp value 186 as shown in FIG. 13 which is determined by the ramp provided from stage 91 until completion of the upshift. The loop stability is governed by gain control stage 106 operating at a specific gain value as determined by the adaptive computer.

Figure 14:
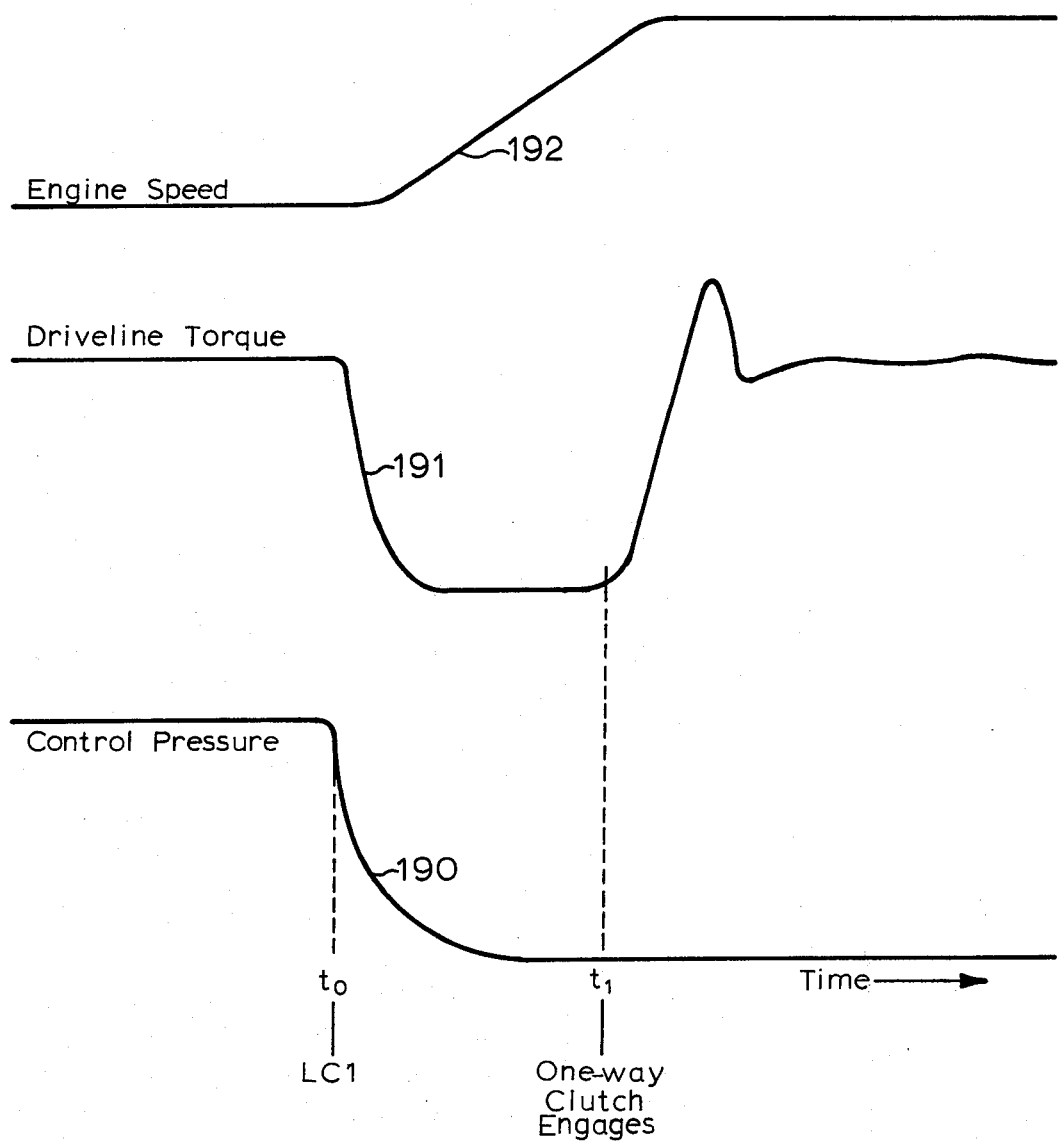
FIGS. 13 and 14 are graphical illustrations useful in understanding operation of the invention during upshift and during downshift of the transmission.

FIG. 14 depicts the variations of engine speed, driveline torque, and control pressure when a downshift is indicated for the system. This operation is initiated by a signal developed in the logic control circuit 51, to issue the LC1 command signal at this time. Immediately the control pressure begins to drop as indicated by the curve 190, the driveline torque also begins to drop rapidly as depicted by the curve 191, and the engine speed gradually increases as shown by curve 192. The output torque bottoms out and, at time $t1$, the one-way clutch 25 engages; the torque then rapidly begins to increase towards its previous value. After some overshoot, the output torque again stabilizes, as does the engine speed. Thus with a one-way clutch, the downshift is simple and straightforward.

TECHNICAL ADVANTAGES

The control system of this invention provides a substantial improvement in shift quality control and is implemented with practical components as described above. A salient part of the inventive system is the reaction torque computer, which provides a simulated reaction torque signal which very closely approximates the instantaneous reaction torque. Use of an adaptive computer establishes values of the torque ramp, system gain, and feed-forward signal level which vary in accordance with instantaneous system operating parameters, and thus enhances the system regulation and individual shift quality. Use of a two-position control valve in combination with a pulse width modulation circuit affords significant economic advantages over such systems which utilize a more expensive servo valve.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only particular embodiments of the invention have been described and claimed herein, it is apparent that various modifications and alterations may be made therein. It is therefore the intention in the appended claims to cover all such modifications and alterations as may fall within the true spirit and scope of the invention.

What is claimed is:

1. A control system for controlling the change of gear ratio in a gear set receiving drive from an engine and having an output drive connection for supplying drive torque to a load, comprising:
   a control unit for the gear set to control the change of gear ratio;
   sensor means operatively associated with the drive connection for providing an output torque signal which varies as a function of said drive torque; and means connecting the sensor means and the control unit, whereby the control unit will control the change of gear ratio in response to said drive torque.

2. A control system for regulating change of gear ratio in a gear set which has an input connection for receiving drive from an engine and an output mechanical drive connection for supplying drive torque to a load, comprising:
  a control unit having an output connection coupled to the gear set to effect a change of gear ratio when the control unit supplies a change-gear signal;
  a sensor, positioned adjacent the mechanical output driving connection of the gear set, for providing an output torque signal which varies as a function of the output drive torque provided by the gear set; and
  means, coupled between the sensor and the control unit, for supplying the output torque signal to the control unit in order that the control unit can control the change of gear ratio in response to the output torque signal.

3. A control system as claimed in claim 2, and further comprising a fluid line coupled to an input connection of the gear set, and a control valve, connected in the fluid line, for regulating the fluid pressure to effect the gear ratio change when the valve is actuated, and means for supplying the change-gear signal from the control unit to the control valve to regulate valve operation.

4. A control system as claimed in claim 2, and further comprising reaction torque computation means, coupled to the sensor to provide a reaction torque signal, and logic control means, coupled between the reaction torque computation means and the control unit, for modifying operation of the control unit as a function of the reaction torque signal.

5. An electronic control system for regulating change of gear ratio in an automatic transmission which has input and output mechanical driving connections, and at least one fluid inlet for receiving a fluid under variable pressure, comprising:
  a transducer, positioned to sense the torque at the transmission output driving connection and to provide an electrical signal which varies as a function of the output torque;
  a control valve, coupled between a fluid line and the transmission fluid inlet, for regulating the fluid pressure to effect a change in gear ratio;
  a closed loop controller, coupled between the transducer and the control valve, to receive the output torque signal as a feedback signal and provide an error signal for regulating operation of the control valve as a function of the error signal;
  a reaction torque computation circuit, connected to receive the output torque signal from the transducer and to produce a reaction torque output signal; and
  a logic control circuit, coupled to the reaction torque computation circuit and operative to provide a plurality of logic command signals for application to the closed loop controller upon receipt of the reaction torque signal to regulate the gear ratio change.

6. An electronic control system as claimed in claim 5, and in which
  said control valve is a two-position valve with a solenoid positioned to regulate the fluid pressure as a function of a received electrical control signal, and said system further comprises
  a pulse width modulation circuit, connected at its output side to supply the electrical control signal to regulate the control valve operation, and having an input connection for receiving the error signal from the closed loop controller.

7. An electronic control system as claimed in claim 5, in which
  said reaction torque computation circuit includes means for producing an average torque signal at a connection point, and in which said control system further includes
  an adaptive computation circuit, having an input circuit coupled to said connection point of the reaction torque computation circuit, operative to provide a plurality of output signals to modify operation of the closed loop controller as a function of the average torque signal received from the reaction torque computation circuit.

8. An electronic control system as claimed in claim 7, and in which
  said closed loop controller comprises a summation stage connected to receive said feedback signal, and a ramp control stage, connected to receive one of the output signals from the adaptive computation circuit and to form a ramp-controlling output signal which is applied to an input connection of said summation stage, such that the ramp-forming signal is a function of the average torque signal supplied to the adaptive computation circuit.

9. An electronic control system as claimed in claim 7, and in which
  said closed loop controller includes a gain control circuit, having an input connection connected to receive one of the output signals from the adaptive computation circuit, thus modifying the gain of the closed loop controller as a function of the average torque signal supplied to the adaptive computation circuit.

10. An electronic control system as claimed in claim 7, and further comprising
  a feed-forward circuit, connected to supply a signal to compensate the operation of said control valve, and having an input connection connected to receive one of the output signals from the adaptive computation circuit, to modify the operation of the feed-forward circuit as a function of the average torque signal supplied to the adaptive computation circuit.

11. An electronic control system for regulating change of gear ratio in an automatic transmission which has input and output mechanical driving connections, and at least one fluid inlet for receiving a fluid under variable pressure, comprising:
  a transducer, positioned to sense the torque at the transmission output driving connection and to provide an electrical signal which varies as a function of the driveline torque;
  a control valve, coupled between a fluid line and the transmission fluid inlet, for regulating the fluid pressure to effect a change in gear ratio;
  a closed loop controller, coupled between the transducer and the control valve, including a summation stage for receiving both the output torque signal as a feedback signal and a pair of input command signals, and a gain control stage coupled in series with the summation stage, which controller operates to provide an error signal for regulating the control valve as a function of the error signal;

a reaction torque computation circuit, connected to receive the output torque signal from the transducer and to produce a reaction torque output signal; and a logic control circuit, connected to provide a plurality of logic command signals for application to the closed loop controller as a function of the reaction torque signal, to regulate the gear ratio change.

12. An electronic control system as claimed in claim 11, in which said reaction torque computation circuit includes means for producing an average torque signal at a connection point, and in which said control system further includes an adaptive computation circuit, having an input circuit coupled to said connection point of the reaction torque computation circuit, operative to provide a plurality of output signals to modify operation of the closed loop controller as a function of the average torque signal received from the reaction torque computation circuit.

13. An electronic control system as claimed in claim 11, and in which said gain control stage has an input connection connected to receive one of the output signals from the adaptive computation circuit, thus modifying the gain of the closed loop controller as a function of the average torque signal supplied to the adaptive computation circuit.

14. An electronic control system as claimed in claim 11, and further comprising a feed-forward circuit, connected to supply a signal to compensate the operation of said control valve, and having an input connection connected to receive one of the output signals from the adaptive computation circuit, to modify the operation of the feed-forward circuit as a function of the average torque signal supplied to the adaptive computation circuit.

15. An electronic control system as claimed in claim 11, and in which said closed loop controller further comprises a ramp control stage, connected to receive one of the output signals from the adaptive computation circuit and to form a ramp-controlling output signal which is applied as one of the input command signals to the summation stage, such that the ramp-forming signal is a function of the average torque signal supplied to the adaptive computation circuit.

16. An electronic control system as claimed in claim 15, in which said closed loop controller further comprises a memory stage, having an input connection for receiving the feedback signal and an output connection for applying a stored signal as the other input command signal to the summation stage, and means for applying one of the logic command signals to both the memory stage and the ramp control stage, causing both these stages to become operational and, in effect, closing a control loop between the transducer and the control valve at this time.

17. The method of regulating gear ratio change in a gear set coupled between an automotive engine and an output mechanical drive connection, comprising the steps of:

sensing the output torque provided by the gear set;

providing a feedback signal which varies as a function of the output torque;

establishing a reference signal;

continually comparing the feedback signal with the reference signal to determine the proper time for effecting the gear ratio change; and modifying the control of the gear ratio change as a function of changes in the feedback signal indicating the output torque.

18. The method of regulating gear ratio change defined in claim 17, and comprising the additional steps of:

operating upon the output torque feedback signal to produce a reaction torque signal; and modifying the control of the gear ratio change as a function of the reaction torque signal.

* * * * *